UNITED STATES PATENT OFFICE.

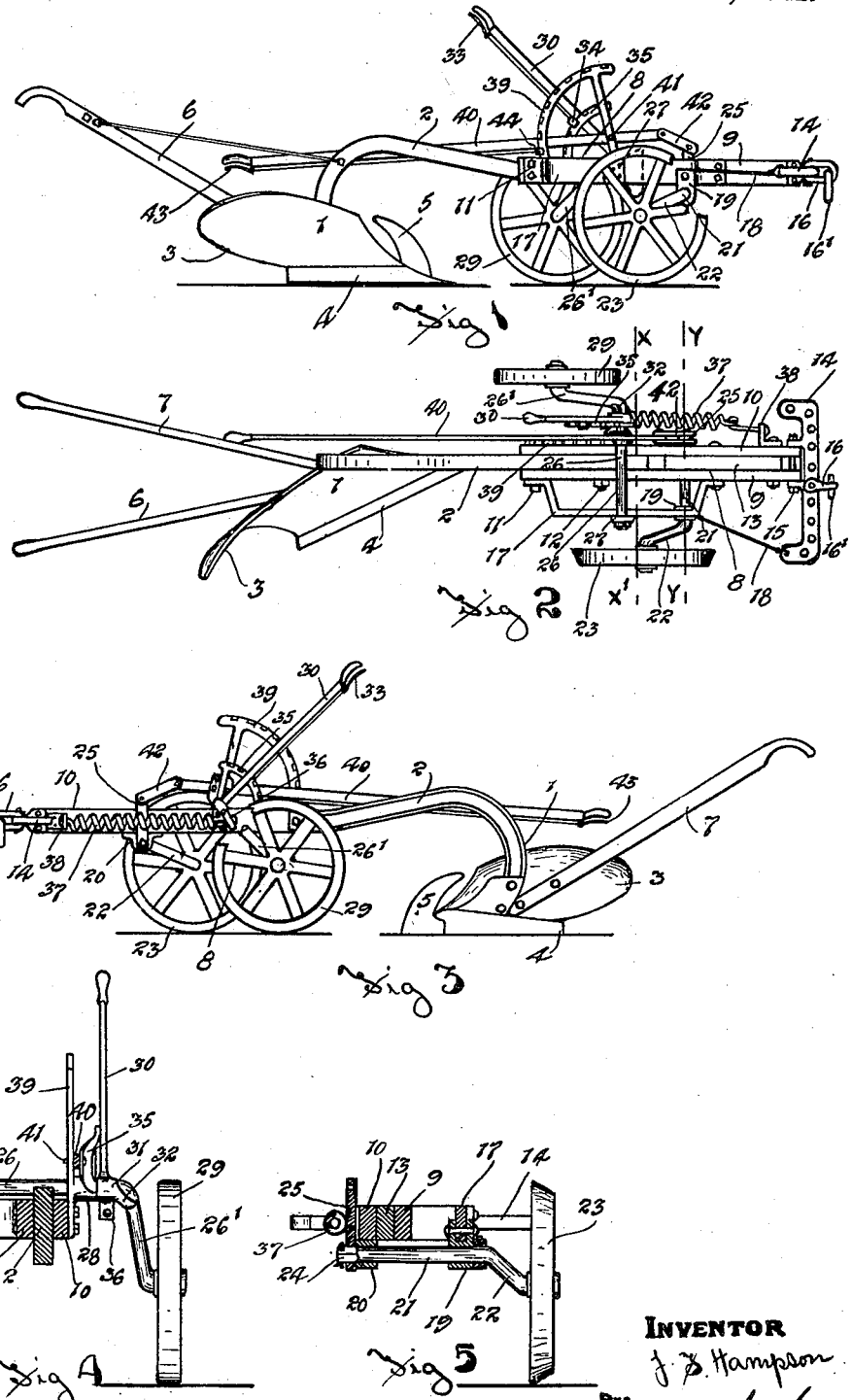

JAMES FREDERICK HAMPSON, OF EDWIN, MANITOBA, CANADA.

PLOW.

1,392,685. Specification of Letters Patent. Patented Oct. 4, 1921.

Application filed January 4, 1919. Serial No. 269,629.

(GRANTED UNDER THE PROVISIONS OF THE ACT OF MARCH 3, 1921, 41 STAT. L., 1313.)

*To all whom it may concern:*

Be it known that I, JAMES FREDERICK HAMPSON, of the town of Edwin, in the Province of Manitoba, Canada, have invented certain new and useful Improvements in Plows, of which the following is the specification.

The invention relates to improvements in plows and particularly to single furrow walking plows and the principal object of the invention is to provide a fore carriage attachment for a single beam single furrow walking plow.

A further object of the invention is to construct the attachment so that it can be readily applied on the plow beam without altering the ordinary plow construction and to arrange the attachment so that it can be readily adjusted as occasion may require.

With the above objects in view the invention consists essentially in the arrangement and construction of parts hereinafter more particularly described and later pointed out in the appended claim, reference being had to the accompanying drawing in which:—

Figure 1 represents a side view of a walking plow with my carriage attachment applied thereon.

Fig. 2 represents a plan view of the same.

Fig. 3 represents a side view of the plow looking at it from the opposite side to that shown in Fig. 1.

Fig. 4 represents an enlarged vertical sectional view through the plow, the section being taken in the line denoted by the line X—X' Fig. 2 and looking rearwardly.

Fig. 5 represents an enlarged detailed vertical sectional view through the plow, the section being taken in the plane denoted by the line Y—Y' Fig. 2 and looking forwardly.

In the drawing like characters of reference indicate corresponding parts in the several figures.

1 represents a single furrow walking plow presenting a customary plow beam 2, mold board 3, share 4, colter 5 and operating handles 6 and 7. These parts are all of ordinary construction so that a further detailed description of them is not herein considered necessary.

The present invention embodies a forecarriage 8 which is attached to the forward or head end of the plow beam 2 and is constructed in detail as now described.

9 and 10 represent a pair of parallel side bars permanently secured, such as by bolting, as indicated at 11 to the side of the forward end of the plow beam. As will be observed the forward ends of these bars extend considerably beyond the forward end of the plow beam and between the bars I locate a filler 13 which is permanently bolted in position to the bars. These side bars form an extension to the plow beam and to the forward ends of them I connect the usual bridle 14 which is fastened by a pivoting bolt 15. The bridle carries the usual adjustable hitching clevis 16 and to which a chain 16' is connected.

To the furrow side of the bar 9 I secure a side bracket 17 the purpose of which will be later disclosed. 18 represents a reinforcing rod inserted between the bracket and the adjacent end of the bridle.

19 and 20 represent bearings secured permanently, one to the underside of the bracket 17 and the other to the underside of the side bar 10. These bearings receive rotatably a forward cross shaft 21 which has the furrow end cranked as indicated at 22 and fitted with a furrow wheel 23. The opposite end of the shaft is squared as indicated at 24 and is supplied with an upwardly extending crank 25 utilized as shortly explained.

Rearwardly of the shaft 21 I locate a rear shaft 26 which is carried by a bearing 27 secured to the bracket and a bearing 28 secured to the side bar 10. The land side end of this shaft terminates in a crank 26' which carries rotatably a land wheel 29. The shaft 26 is controlled by a hand lever 30 having the inner end thereof formed into a sleeve like member 31 which receives the shaft and is provided with an extension 32 engaging the crank and arranged such that when the lever is turned the crank is swung and consequently the shaft. The lever is fitted with the usual hand latch 33 and detent 34, the detent operating over a quadrant 35 extending upwardly from the sleeve 28. A lug 36 extends downwardly from the underside of the sleeve 31 and a spring 37 passes between the lug 36 and an angle bracket 38 permanently secured to the forward end of the bar 10.

According to the above arrangement it will be seen that the land wheel can be adjusted as occasion may require by manipulating and setting the lever 30 and that the spring 37 acts to carry the weight of the plow and makes the operating of the lever easier.

The bearing 28 carries what might be termed a large quadrant 39 and between the quadrant 35 and 39 I pivot a long lever 40, the pivot point being indicated at 41. The forward end of the lever 40 is connected by a pair of swinging links 42 to the upper end of the crank 25, and the said lever is fitted with a hand latch 43 and detent 44, the detent operating over the large quadrant 39.

By manipulating the lever 40 one can adjust the furrow wheel as desired and this together with the adjustment of the land wheel allows of the manipulation of the plow as occasion may require.

What I claim as my invention is:—

The combination with the beam of a walking plow, of a pair of side bars bolted to the forward end of the plow beam and extending in advance thereof, a hitching connection attached to the forward end of the bars, a side bracket secured permanently to one of the bars, a forward cross shaft carried in bearings provided on one of the bars and bracket, said shaft having a cranked end, a furrow wheel rotatably mounted on the cranked end of the shaft, a rear cross shaft rotatably mounted in bearings carried by the bracket, and one of the bars and having a cranked end, a land wheel rotatably mounted on the cranked end of the latter shaft and positioned at the opposite side of the plow beam to the furrow wheel, adjustable levers controlling the adjustment of the crank shafts and a spring acting upon the land wheel controlling lever.

Signed at Portage La Prairie, in Manitoba, this 27th day of November, 1918.

JAMES FREDERICK HAMPSON.

In the presence of—
J. C. MILLER,
E. C. MILLER.